(12) United States Patent
Benesch

(10) Patent No.: US 8,130,523 B2
(45) Date of Patent: Mar. 6, 2012

(54) METHOD AND APPARATUS FOR SETTING A FEEDBACK POWER OF A FUNDAMENTAL FREQUENCY CLOCKED CONVERTER

(75) Inventor: Norbert Benesch, Heroldsberg (DE)

(73) Assignee: Siemens Aktiengesellschaft, München (DE)

( * ) Notice: Subject to any disclaimer, the term of this patent is extended or adjusted under 35 U.S.C. 154(b) by 418 days.

(21) Appl. No.: 12/499,404

(22) Filed: Jul. 8, 2009

(65) Prior Publication Data

US 2010/0008115 A1  Jan. 14, 2010

(30) Foreign Application Priority Data

Jul. 9, 2008 (EP) .................................. 08012432

(51) Int. Cl.
*H02M 7/219* (2006.01)
(52) U.S. Cl. ......................................... 363/89; 363/127
(58) Field of Classification Search .................... 363/44, 363/48, 84, 89, 125, 127
See application file for complete search history.

(56) References Cited

U.S. PATENT DOCUMENTS 5,483,435 A * 1/1996 Uchino ............................ 363/81
7,447,051 B2 * 11/2008 Masino et al. ................ 363/127
7,471,529 B2 * 12/2008 Jin et al. ........................... 363/87
7,751,211 B2 * 7/2010 Yuzurihara et al. ........... 363/127

FOREIGN PATENT DOCUMENTS

| DE | 102005012150 A1 | 9/2006 |
| DE | 102006015031 A1 | 10/2007 |
| DE | 102006028103 A1 | 12/2007 |
| EP | 0353569 A2 | 2/1990 |

OTHER PUBLICATIONS

Translation of German Reference DE 102006028103 Dec. 2007, Norbert Benesch.*

* cited by examiner

*Primary Examiner* — Gary L Laxton
(74) *Attorney, Agent, or Firm* — Henry M. Feiereisen; Ursula B. Day

(57) ABSTRACT

A method and an apparatus for setting a feedback power of a converter clocked at a fundamental frequency on the power supply side are disclosed. The converter includes a bridge circuit equipped with controllable semiconductor switches, wherein the semiconductor switches are clocked at the fundamental frequency depending on a desired direction of a power flow through the bridge circuit. Drive signals for the semiconductor switches are derived from the clock pulses at the fundamental frequency and a switch-on delay which depends on a DC link voltage of a DC link connected to the converter. The switch-on delay is determined based on a predetermined characteristic curve that depends on the DC link voltage.

13 Claims, 11 Drawing Sheets

FIG 2
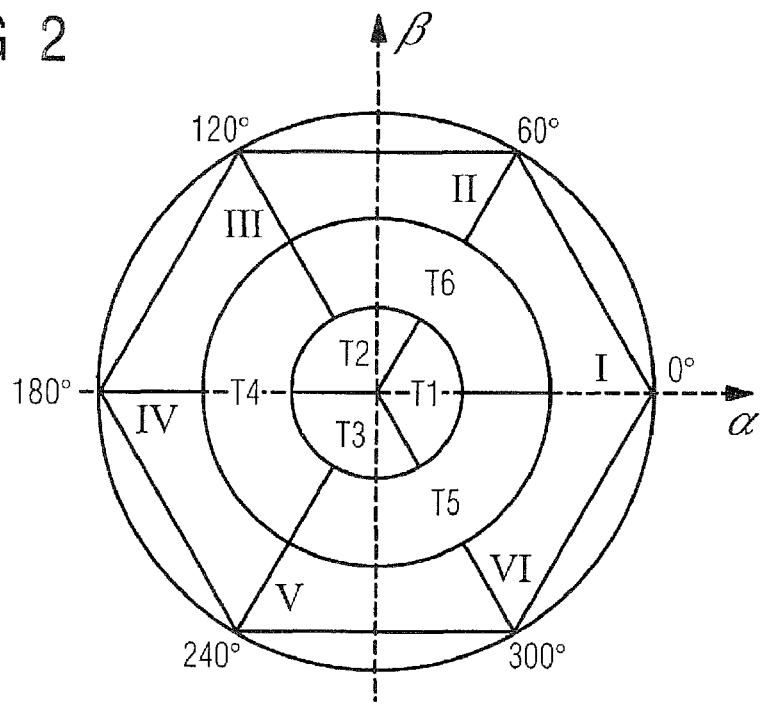
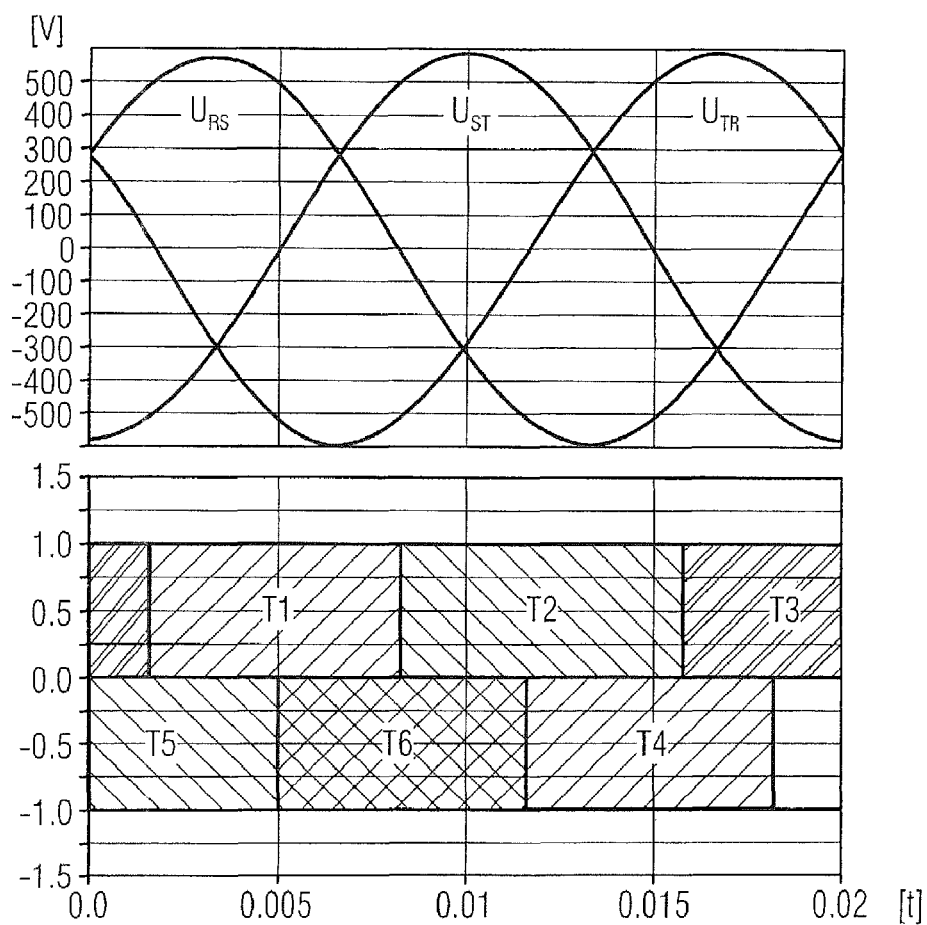

METHOD AND APPARATUS FOR SETTING A FEEDBACK POWER OF A FUNDAMENTAL FREQUENCY CLOCKED CONVERTER

CROSS-REFERENCES TO RELATED APPLICATIONS

This application claims the priority of European Patent Application, Serial No. EP08012432, filed Jul. 9, 2008, pursuant to 35 U.S.C. 119(a)-(d), the content of which is incorporated herein by reference in its entirety as if fully set forth herein.

BACKGROUND OF THE INVENTION

The present invention relates to a method for setting, in particular for variably setting, a feedback power of a fundamental frequency clocked converter on the power supply side with a bridge circuit equipped with controllable semiconductor switches, and to an apparatus provided for implementing the method.

The following discussion of related art is provided to assist the reader in understanding the advantages of the invention, and is not to be construed as an admission that this related art is prior art to this invention.

A converter device or a converter circuit can include at least one power supply connection and phase sections which are provided therefor as power supply connection and function as current paths, in other words three phases in the case of connection to a three-phase power supply, then the actual converter comprising the bridge circuit that implements the conversion functionality, and a DC link at the output of the converter, wherein a first output of the converter forms a first DC link terminal and a second output of the converter forms a second DC link terminal. A DC link voltage is present between these two DC link terminals during operation, said DC link voltage arising as a DC voltage due to the conversion. For the purpose of buffering and smoothing the DC link voltage, a DC link capacitance is usually arranged between the DC link terminals.

In the case of a positive power flow arising during operation into the DC link, the converter operates approximately like a so-called B6 diode bridge, since only the diodes that the converter comprises carry the current and transistors that are respectively reverse-connected in parallel therewith as semiconductor switches are deenergized. Conversely, in the case of power flow from the DC link into the power supply, the diodes are reverse-biased and precisely one path into the power supply is made possible for the current by corresponding activation of individual transistors at each point in time. One preferred circuit for the bridge circuit forming the converter is a so-called IGBT B6 bridge (insulated gate bipolar transistor), which comprises a passive parallel diode bridge that enables purely passive operation in one power direction, that is to say e.g. for the power flow into the DC link, and an active feed-in/feedback power flow, that is to say correspondingly e.g. from the DC link into the power supply. In fundamental frequency operation, switching edges for driving the transistors, which are referred to hereinafter generally as semiconductor switches, are at so-called natural triggering instants, that is to say intersection points of the power supply voltages which are fed to the circuit or to the device via the individual current paths, that is to say—in the case of a three-phase power supply, the individual lines—designated hereinafter by R, S, T—of the three-phase power supply with the power supply voltages $U_R$, $U_S$ and $U_T$ fed by means thereof.

Fundamental frequency clocked operation of converters is distinguished by some advantages that make it expedient to use. Since the semiconductor switches, which can also be referred to as current valves, are not clocked at high frequency, this results for example in low switching losses and furthermore in the possibility of using simple and cost-effective commutation inductors and power supply filters, and finally in low excitation of system oscillations that can lead e.g. to high motor bearing currents. Finally, the operation of converters of this type is generally robust with respect to power supply disturbances, power supply unbalances and the like.

A considerable disadvantage of this operating mode hitherto has been, for example, that a relatively large reactive power requirement arises in the case of no load or in the case of weak loading of the converter. This leads to a loading of the power supply system for the user and to increased energy costs. The technology thereby becomes more difficult to impart or market. A further disadvantage is that, in the case of power supply voltage dips, the DC link voltage follows the power supply voltage and energy stored in the DC link for buffering is thus lost.

A simple measure for avoiding these disadvantages is to switch on the semiconductor switches only when energy feedback into the power supply is necessary. A simple criterion for this may be e.g. the rising of the DC link voltage above a threshold value. The feedback, that is to say the driving of the semiconductor switches, can be deactivated again as soon as e.g. DC link voltage has fallen below a lower threshold value or the active current into the power supply has fallen on average below a specific value.

In order to achieve a stable operating state and a sufficient effect of this measure, the two threshold values must not be too close together. Moreover, the power supply voltage and thus the natural rectification voltage may be subject to large fluctuations, for which the thresholds must likewise be sufficiently spaced apart. Moreover, the DC link functioning as an energy buffer can be utilized all the better in the event of load changes, the greater the separation between the two thresholds. During operation, however, a rapid change in the DC link voltage can have adverse effects on the process to be operated/the application to be operated and lead e.g. to a reduction of the torque accuracy in the case of electric drives and hence deviations from a desired position.

To date, the problem outlined above has been solved e.g. either by using a large commutation inductance with the disadvantages of increased costs and an undesirable increased voltage drop, or by using a large DC link capacitance with the disadvantages of increased costs, or by means of a control-technological compensation of the voltage changes in the DC link and likewise the disadvantages of increased costs owing to requirements made of a short controller clock cycle or on account of additionally required circuitry measures.

In one conventional converter, a changeover is made between fundamental frequency uncontrolled operation and clocked voltage-controlled operation when the operating mode of the converter at a point in time is found to be unsuitable for the instantaneous power requirements made of the converter.

It would therefore be desirable and advantageous to provide an improved method for controlling instances of fundamental frequency feed-in/feedback to obviate prior art shortcomings and to maintain the abovementioned major advantages of occasional turn-off of the transistors T1-T6 during motor feed-in operation (robust behavior of a diode bridge in the event of power supply disturbances, no additional harmonic reactive power requirement in the case of no load and partial load, reduced switching losses) and at the same time avoids rapid and large changes in the DC link voltage at the start of fundamental frequency feedback operation.

SUMMARY OF THE INVENTION

According to one aspect of the present invention, a method for setting a feedback power of a converter clocked at a fundamental frequency on the power supply side and having a bridge circuit equipped with controllable semiconductor switches includes the steps of clocking the semiconductor switches at the fundamental frequency in dependence of a desired direction of a power flow via the bridge circuit, and deriving drive signals for the semiconductor switches from clock pulses at the fundamental frequency and a switch-on delay dependent on a system variable of the converter. The switch-on delay is determined from a predetermined characteristic curve that depends on the system variable.

According to another aspect of the invention, a converter device includes a converter clocked at a fundamental frequency on a power supply side, wherein the converter includes a bridge circuit equipped with controllable semiconductor switches which are clocked depending on a desired direction of a power flow through the bridge circuit. The converter device also includes means for deriving drive signals for the semiconductor switches from clock pulses at the fundamental frequency and a switch-on delay dependent on a system variable of the converter, and means for determining the switch-on delay based on a predetermined characteristic curve that depends on the system variable.

In one embodiment, the switch-on delay may determined on the basis of a predetermined characteristic curve depending on the respective system variable, in particular the DC link voltage, where "dependent" should be interpreted broadly here such that e.g. a DC link power that is related to the DC link voltage as by a multiplicative factor should also be regarded as "dependent on the DC link voltage". The predetermined characteristic curve, or the DC link voltage, may define limit values for limiting a current.

According to another embodiment, the characteristic curve may be supplemented by an integrating term, which successively reduces the switch-on delay. In addition, the switch-on delay may also define a negative switch-off delay.

With the invention, voltage-dependent feedback can be enabled easily and robustly in fundamental frequency operation. By preventing an abrupt enablement of the feedback, a sudden decrease in the DC link voltage and a very rapid increase in the power supply current are eliminated, with the following advantages:

Torque disturbances in the drive as a result of uncompensated changes in the DC link voltage are eliminated.

A threshold value for the DC link voltage for enabling the feedback can be high (large current-driving differential voltage in the case of enabling the feedback). The energy buffering of the DC link in the case of load changes can thus be better utilized. This results, in particular, in improved efficiency, possible continued operation in the event of power supply disturbances, and improved thermal loading.

If required, the DC link voltage can be increased/controlled for particular applications (e.g. the operating characteristic of a so-called chopper can be realized at lower costs).

Higher acceptance of the fundamental frequency operation by the user, since feedback is provided only when necessary.

On average reduced thermal loading of the converter and of the additional components.

No increase in the switching frequency of the semiconductor switches in the case of the proposed approach for reducing the switching sector.

Cost-effective implementation (no additional component outlay or manufacturing outlay).

Compatible with the previous implementation of fundamental frequency operation.

The drive signals for activating the individual semiconductor switches are characteristic of a converter operating according to the present invention.

The method outlined above and explained in greater detail below can be implemented in software and/or firmware (Microcode according to VHDL or the like in FPGA, ASIC or the like), such that the invention also relates to a computer program having program code instructions or microcode instructions executable by a computer. In this respect, the invention then also relates to a storage medium with such a computer program executable by a computer, and to a converter device on which such a computer program is loaded. Finally, the invention also relates to a converter device with a processing unit implemented as a processor or the like as means for deriving drive signals for the semiconductor switches from the fundamental frequency clocking and a switch-on delay dependent on a DC link voltage of a DC link connected to the converter, and as means for determining the switch-on delay on the basis of a predetermined or predeterminable characteristic curve depending on the DC link voltage, wherein a computer program as outlined above is loaded on the processing unit, and/or wherein the processing unit is intended and provided for executing such a computer program.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 shows a diagram illustrating control logic of the semiconductor switches with switching sectors on which the control logic is based.

DETAILED DESCRIPTION OF PREFERRED EMBODIMENTS

Figure 1:
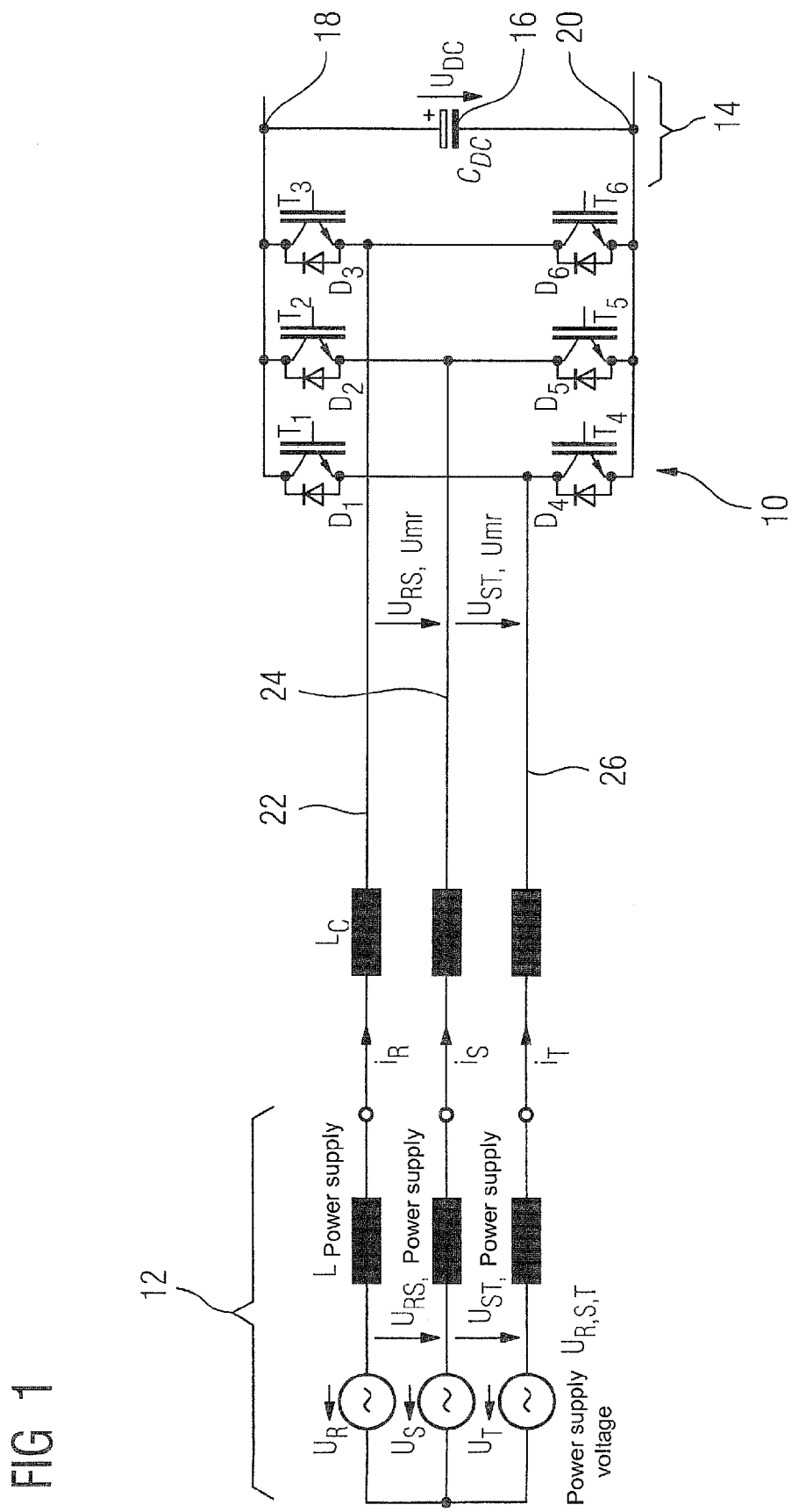
FIG. 1 shows a converter with a bridge circuit having semiconductor switches on a three-phase power supply.

Throughout all the figures, same or corresponding elements may generally be indicated by same reference numerals. These depicted embodiments are to be understood as illustrative of the invention and not as limiting in any way. Rather, numerous alterations and modifications are possible in the context of the present disclosure, in particular those variants, elements and combinations which, for example through combination or modification of individual features or elements or method steps in conjunction with the features or elements or method steps which are described in the general or specific part of the description and are contained in the claims and/or the drawing, can be inferred by the person skilled in the art with regard to achieving the object and, through combinable features, lead to a new subject matter or to new method steps or method step sequences. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in a schematically simplified manner, the connection and the construction of a converter 10 on a three-phase power supply 12, wherein the converter 10 includes a bridge circuit equipped with controllable semiconductor switches T1, T2, T3, T4, T5, T6 and diodes D1, D2, D3, D4, D5, D6 reverse-connected in parallel, in particular in an embodiment as an IGBT B6 bridge.

A DC link 14 is disposed downstream of the converter 10 at the output thereof, said DC link comprising a DC link capacitance 16, across which a DC link voltage $u_{DC}$ is dropped during operation. The DC link capacitance 16 is also designated as $C_{DC}$ in accordance with conventional circuit element designations. A drive (not shown here) is usually connected to the DC link 14 as a load during operation.

From the converter 10, a number of upper semiconductor switches T1-T3, exactly three upper semiconductor switches T1-T3 in the case illustrated, are connected to a first DC link terminal 18, which is at a first DC link potential during operation of the converter 10. A number of lower semiconductor switches T4-T6, exactly three lower semiconductor switches T4-T6 in the case illustrated, are correspondingly connected to a second DC link terminal 20, which is at a second DC link potential during operation of the converter 10. The DC link capacitor 16 is connected between the first and second DC link terminals 18, 20 and the potential difference between the potentials present at said contacts 18, 20 corresponds to the DC link voltage $u_{DC}$.

On the input side, the converter 10 is connected to the power supply 12, to be precise via phase sections 22, 24, 26 on the power supply side, to be precise in such a way that each phase section 22-26 is connected to a center tap between respectively an upper and a lower semiconductor switch T1-T6. Each phase section 22-26 includes a commutation inductor $L_C$ and a current $i_R$, $i_S$, $i_T$ determined by the power supply voltages $u_R$, $u_S$, $u_T$ flows in each phase section 22-26. For the feeding power supply 12, a power supply inductance $L_{power\ supply}$ is respectively shown for each phase R, S, T.

Switching edges for driving the semiconductor switches T1-T6, for fundamental frequency operation, are at so-called natural triggering instants, namely the intersection points of the sinusoidal power supply voltages $u_R$, $u_S$, $u_T$ or the zero crossings of the voltages between lines $u_{RS}$, $u_{ST}$ and $u_{TR}$, or at least in the vicinity of such triggering instants, the position of the switching edges being improved, if appropriate, by optimization.

In this respect, FIG. 2 illustrates a power supply period of 0°-360° in a schematically simplified manner for elucidating a control logic of the semiconductor switches T1-T6 in fundamental frequency operation, wherein the illustration on the left-hand side of FIG. 2 is referred to hereinafter as sector diagram and a changeover (commutation) between two semiconductor switches T1-T6 respectively takes place at sector boundaries depicted in said diagram (at 0°, 60°, 120°, 180°, 240°, 300°), e.g. between the semiconductor switches designated by T5 and T6 at the sector boundary at 0°. In the case of positive power flow in the DC link 14, the converter 10 operates approximately like a B6 diode bridge, since the diodes D1-D6 carry the current and the semiconductor switches T1-T6 that are respectively reverse-connected in parallel therewith are deenergized. In the case of power flow from the DC link 14 into the power supply 12, the diodes D1-D6 are reverse-biased and precisely one path via respectively active semiconductor switches T1-T6 into the power supply 12 is made possible for the current at each point in time.

Fundamental frequency clocked operation of converters is distinguished by some advantages that make it expedient to use. Since the semiconductor switches, which can also be referred to as current valves, are not clocked at high frequency, this results for example in low switching losses and furthermore in the possibility of using simple and cost-effective commutation inductors and power supply filters, and finally in low excitation of system oscillations that can lead e.g. to high motor bearing currents. Finally, the operation of converters of this type is generally robust with respect to power supply disturbances, power supply unbalances and the like.

A disadvantage of such an operating mode that has arisen, however, is that a relatively large reactive power requirement arises in the case of no load or in the case of weak loading of the converter, which leads to a loading of the power supply system for the user and to increased energy costs. Furthermore, in the case of power supply voltage dips, the DC link voltage $u_{DC}$ follows the power supply voltage, with the result that energy stored in the DC link for buffering is lost.

A simple measure for eliminating these disadvantages is to switch on the semiconductor switches T1-T6 only when energy feedback into the power supply is necessary. A simple criterion for this may be e.g. the rising of the DC link voltage $u_{DC}$ above an upper threshold value $u_{DC1}$. The feedback, that is to say the driving of the semiconductor switches T1-T6, can be deactivated again as soon as e.g. the DC link voltage $u_{DC}$ has fallen below a lower threshold value $u_{DC2}$ or the active current into the power supply has fallen on average below a specific value.

In order to achieve a stable operating state and a sufficient effect of this measure, the two threshold values $u_{DC1}$, $u_{DC2}$ must not be too close together. Moreover, the power supply voltage and thus the natural rectification voltage may be subject to large fluctuations, for which the thresholds $u_{DC1}$, $u_{DC2}$ must likewise be sufficiently spaced apart. Moreover, the DC link functioning as an energy buffer can be utilized all the better in the event of load changes, the greater the separation between the two thresholds $u_{DC1}$, $u_{DC2}$.

Figure 3:
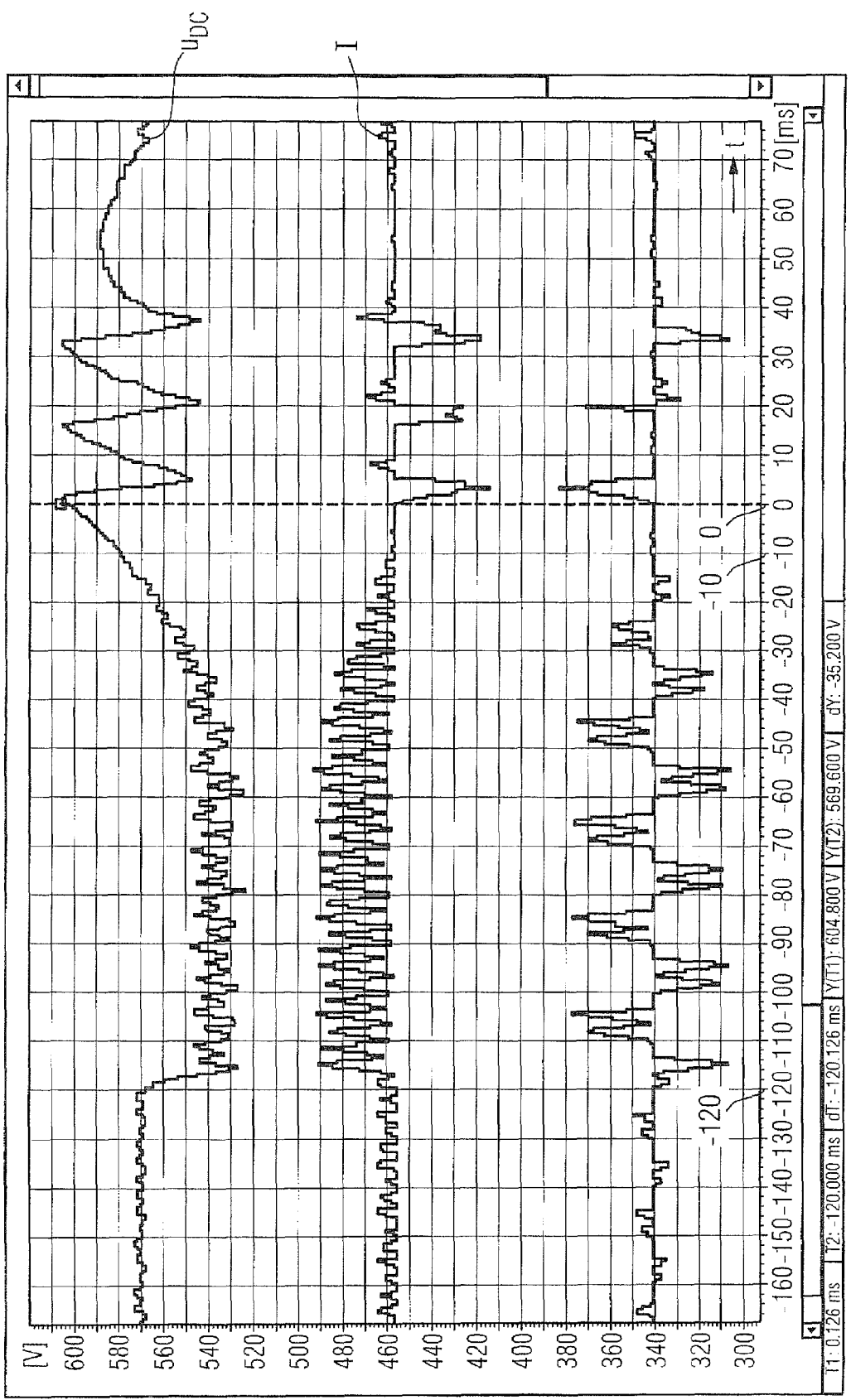
FIG. 3 shows an exemplary sequence of feedback with shortened switching sectors.

An exemplary sequence is illustrated in FIG. 3, which shows a temporal profile of the DC link voltage $u_{DC}$, of an active current and of the current in power supply phase: in the case of motor loading of the DC link 14 (FIG. 1), at t=−120 ms firstly the DC link voltage $u_{DC}$ falls and an active current I exhibiting harmonics flows via the internal B6 diode bridge, the semiconductor switches T1-T6 being turned off. Afterward, the motor loading decreases and, starting from approximately t=−10 ms, the DC link 14 is charged by the connected load. Starting from a specific instant (here $u_{DC} > u_{DC2}$ at t=0), the fundamental frequency driving of the semiconductor switches T1-T6 is activated at the natural triggering instants. Since the full feedback power is immediately available, the DC link voltage $u_{DC}$ falls very rapidly (depending on the magnitude of the DC link capacitor 16, the power supply inductance $L_{power\ supply}$ and the voltage difference between power supply and DC link); by more than 20 V/ms in the case illustrated.

The rapid change in the DC link voltage $u_{DC}$ can have adverse effects on the process to be operated/the application to be operated, e.g. a reduction of the torque accuracy in the case of electric drives.

To date, the problem outlined above has been solved e.g. either by using a large commutation inductance $L_C$ with the disadvantages of increased costs and an undesirable additional voltage drop, or by using a large DC link capacitance 16 with the disadvantages of increased costs, or by means of a control-technological compensation of the $u_{DC}$ voltage change in the drive and likewise the disadvantages of increased costs owing to requirements made of a short controller clock cycle or on account of additionally required circuitry measures.

Although fundamental frequency or power supply frequency operation permits energy flow both in the feed-in direction and in the feedback direction, it is uncontrolled, that is to say that power supply current and DC link voltage $u_{DC}$ are established freely depending on present power supply voltage and DC link loading. What is characteristic is that, for the feedback, the semiconductor switches T1-T6 are driven with the clock timing of the power supply frequency.

The approach according to the invention now aims to alter the control of the transistors in such a way that a reduction of the feedback power is achieved and a slower change in the DC link voltage $u_{DC}$ thus results. This is expedient particularly at the point in time of enabling the feedback in the case of preceding diode bridge operation.

What is proposed for this purpose is a reduction of the switching sector (cf. FIG. 2) depending on one or more system variables, preferably the DC link voltage $u_{DC}$, a DC link current, a power supply current, a power supply voltage, an external signal, e.g. one from a connected load or one from a connected inverter, etc., or a system variable that is directly or indirectly dependent on one or more of the abovementioned system variables, e.g. a DC link power (P=$u_{DC} \times i_{DC}$), and/or a reduction of the current limit depending on one or more system variables of such system variables, preferably the DC link voltage $u_{DC}$. In specific detail:

Reduction of the Switching Sector

Figure 4:
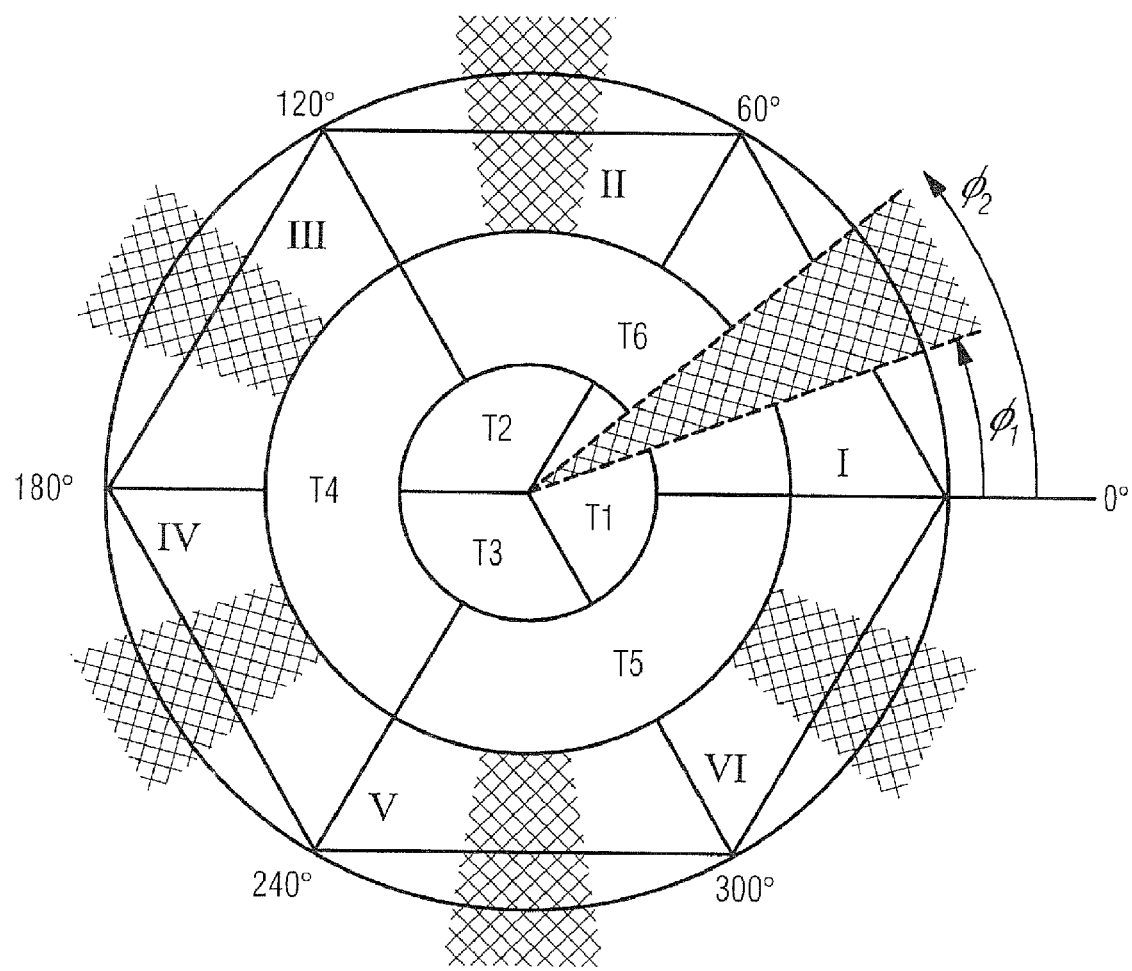
FIG. 4 illustrates graphically a shortened switching sector.

It is proposed to influence the feedback power by reducing the switching sector. Instead of at the natural triggering instants (FIG. 2) the transistors functioning as semiconductor switches T1-T6 are switched on later and switched off again earlier. FIG. 4 shows this way of example for the first sector (I), wherein two of the transistors used as semiconductor switches T1-T6, namely the transistors designated by T1 and T6, are not switched on from 0° to 60° power supply angle, but rather are switched on only from $\phi_1$ to $\phi_2$. During the rest of the time, all the semiconductor switches T1-T6 are open and permit no feedback. The values for $\phi_1$ thus lead to a switch-on delay of the respective semiconductor switches T1-T6, while the values for $\phi_2$ lead to a switching-off of the semiconductor switches T1-T6, which is referred to here and hereinafter as a negative switch-off delay.

Figure 5:
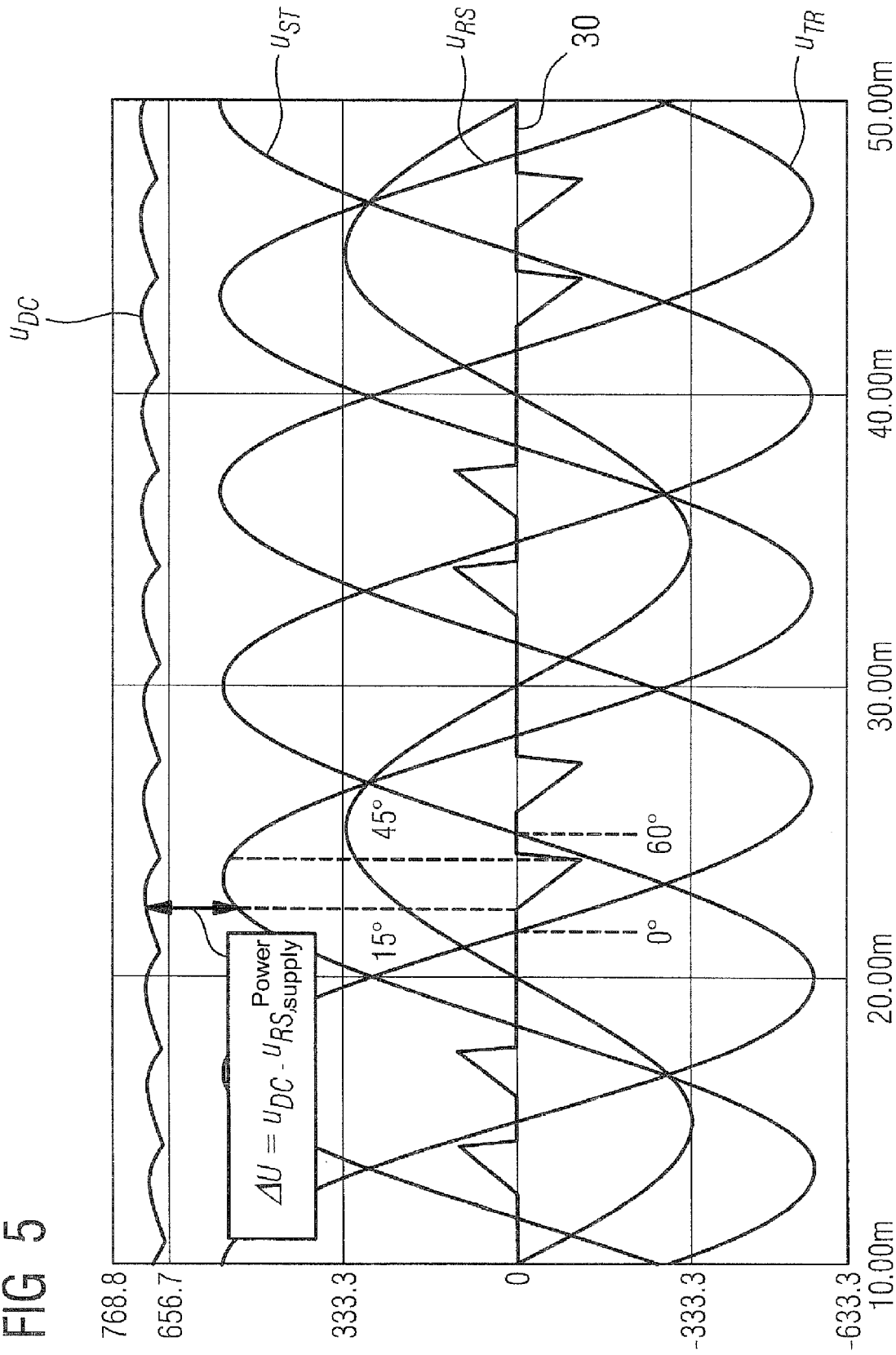
FIGS. 5 to 7 show, for three steady-state operating points, a diagram of a dependence of an average power supply current and an average DC link voltage correlated therewith on the size of the switching sector.
Figure 6:
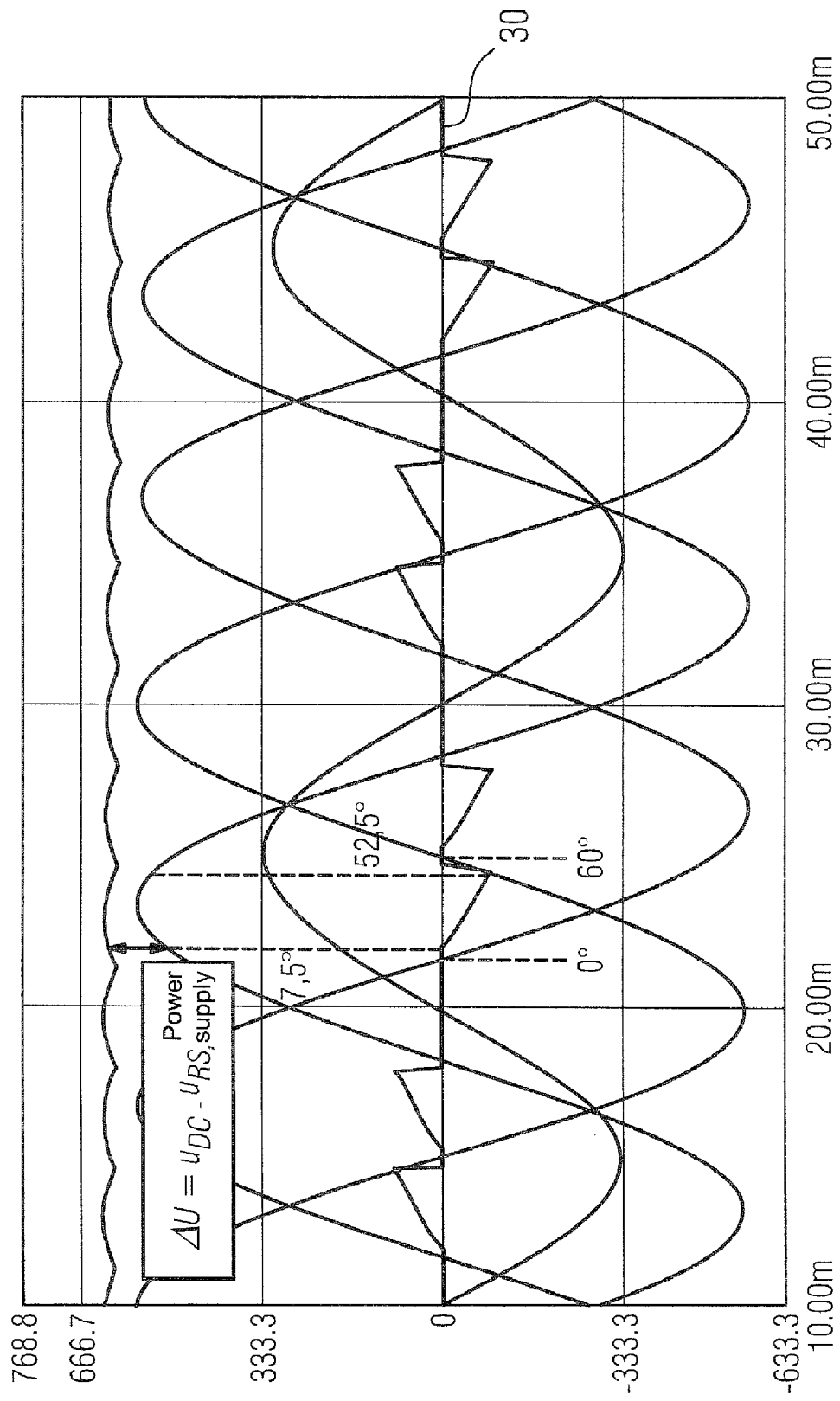
Figure 7:
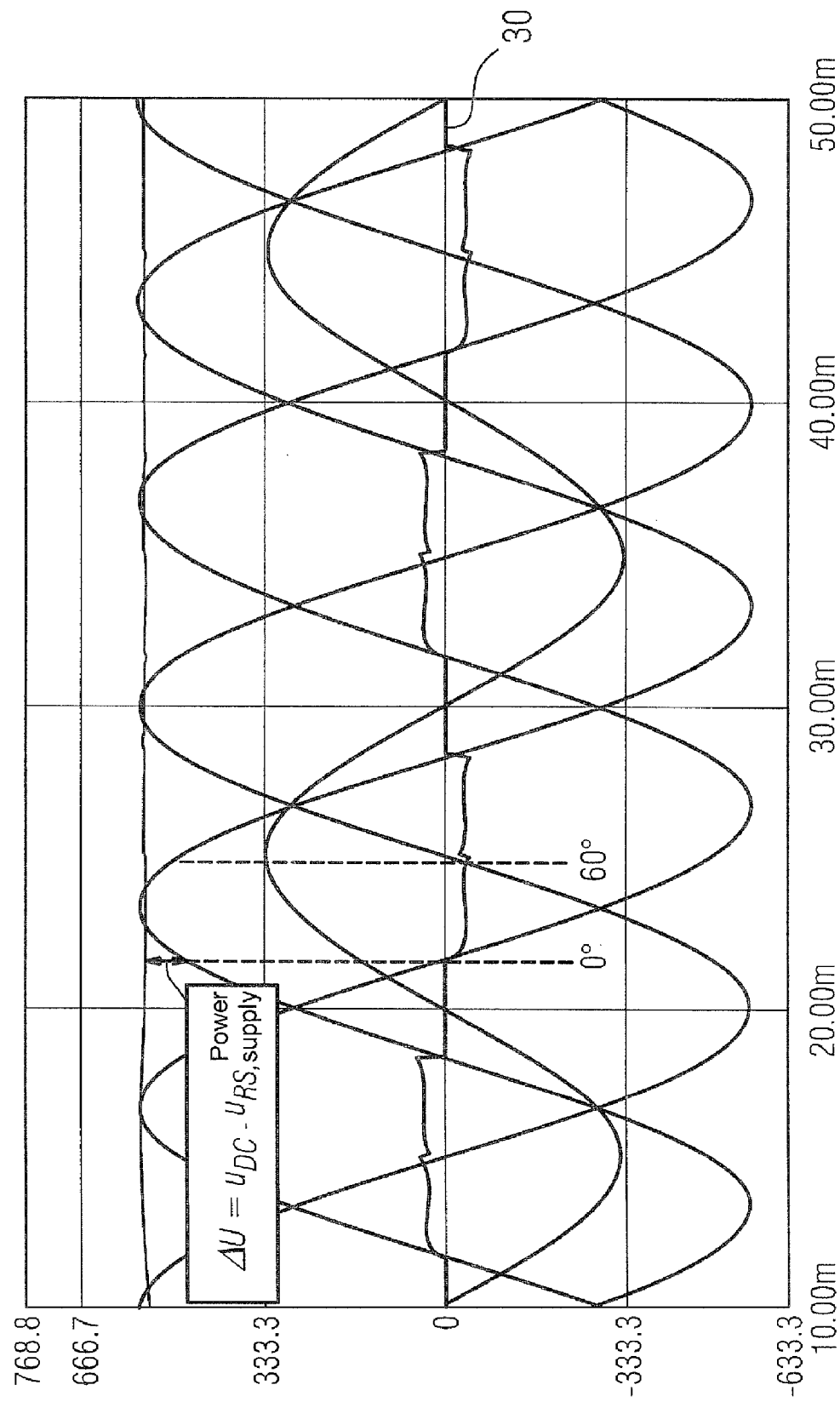

FIGS. 5 to 7 illustrate by way of example for three steady-state operating points how the average power supply current and thus the average DC link voltage $u_{DC}$ depend on the size of the switching sector. Preferably, $\phi_2$ is chosen in such a way that $\phi_2=60°-\phi_1>30°$ holds true. In specific detail, FIG. 5 shows a situation for a feedback power of 20 kW, wherein a resulting average DC link voltage $u_{DC}$ of approximately 690V arises by reducing the switching sector to $\phi_1=60°-\phi_2=15°$. FIG. 6 shows a situation for a feedback power of 20 kW, wherein a resulting average DC link voltage $u_{DC}$ of approximately 620V arises by reducing the switching sector to $\phi_1=60°-\phi_2=7.5°$. Finally, FIG. 7 shows a situation in which a resulting average DC link voltage $u_{DC}$ of approximately 550V arises given a feedback power of 20 kW and a full switching sector ($\phi_1=60°-\phi_2=0°$). A signal for driving the respective semiconductor switches T1-T6 (drive signal 30) is shown in each case in the center of the illustrations in FIG. 5 to FIG. 7.

Figure 8:
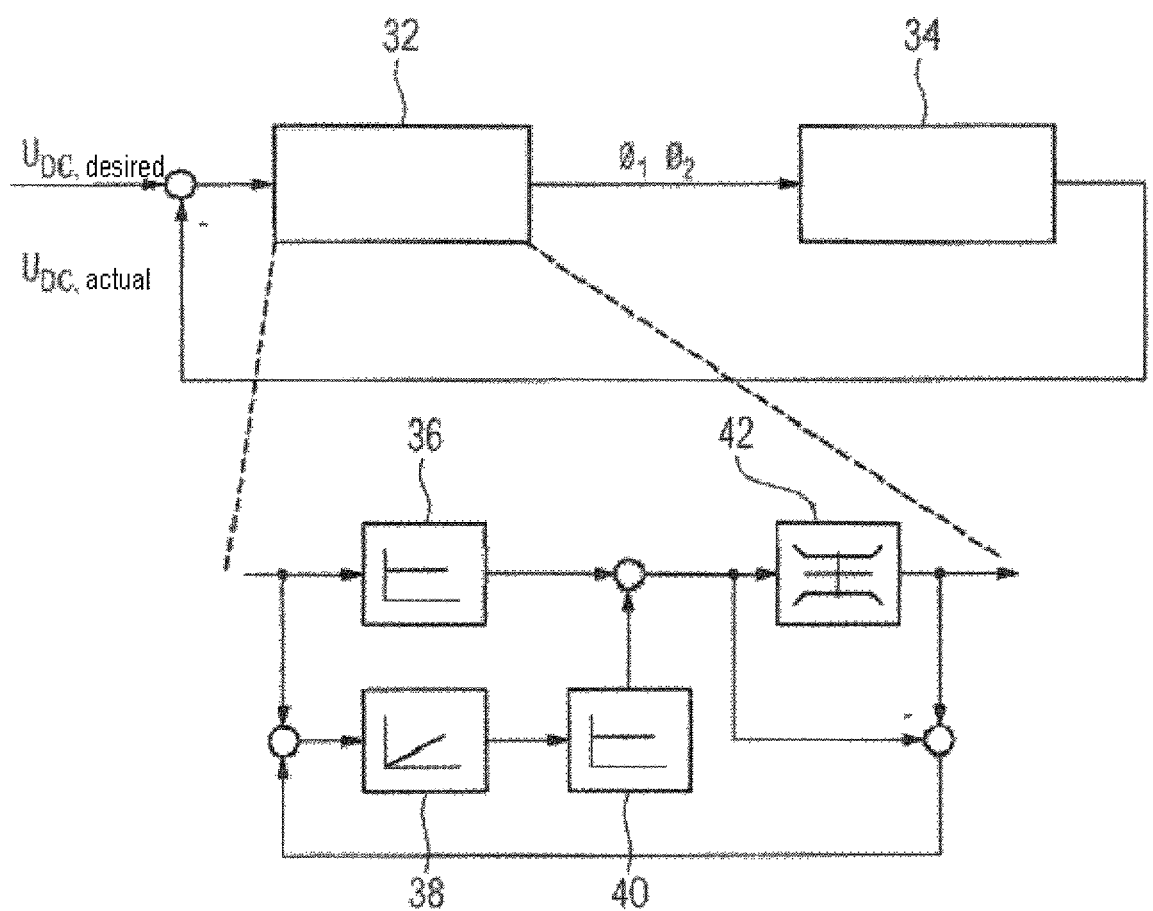
FIG. 8 shows a block diagram of a control loop for determining the size of the switching sector.

For adapting the angle $\phi_1$ depending on the DC link voltage $u_{DC}$, at least the following approaches are considered:

1. A $\phi_1(u_{DC})$ characteristic curve for continuously increasing the feedback power in the case of a rising DC link voltage $$\phi_1(u_{DC}) = \left(1 - \frac{u_{DC} - u_{DC,min}}{u_{DC,max} - u_{DC,min}}\right)\phi_{1,max}$$

for $u_{DC,min} < u_{DC} < u_{DC,max}$ $$\phi_1(u_{DC}) = 0$$

for $u_{DC} \geq u_{DC,max}$ $$\phi_1(u_{DC}) = \phi_{1,max}$$

for $u_{DC} \leq u_{DC,min}$, wherein a full feedback power is attained starting from $u_{DC,max}$ and the switching sector is the smallest below $u_{DC,min}$, and wherein, as already mentioned, the transistors are permanently turned off below a further $u_{DC}$ threshold, since feedback is then no longer required and charge-reversal currents between power supply and DC link are thus avoided, or 2. A $\phi_1(u_{DC})$ characteristic curve as under 1, extended by an integrating term, in order to be able to operate with a full switching sector during continuous feedback operation, that is to say to achieve $\phi_1=0$, wherein e.g. at the beginning of feedback firstly an initialization value $\phi_{1,max,Init}$ is used, wherein subsequently e.g. in the case of a digital realization in each sampling step the switching sector is increased again by the magnitude $\Delta\phi_1$ $\phi_{1,max}(k+1)=\phi_{1,max}(k)-\Delta\phi_1$ for $\phi_{1,max}(k+1)>0$ otherwise $\phi_{1,max}(k+1)=0$ holds true or 3. A complete closed-loop control (analog/digital) which, in particular, can also have an integrating component (with limiting and anti-windup function). In this respect, FIG. 8 shows a block diagram of the control loop comprising a DC link voltage controller illustrated as controller 32 and comprising a combination—illustrated as section 34—of a switching logic for driving the semiconductor switches T1-T6 and the converter 10. In accordance with the more detailed illustration of the controller 32, the latter includes a first function block 36, which functions as a proportional element (P element) as part of a proportional channel for the closed-loop control, a second function block 38, which functions as an integral element (I element) for realizing an integral component of the closed-loop control, a third function block 40, which functions as a proportional element (P element), for realizing a proportional gain of the integral channel and a fourth function block 42, which functions as a limiting element (anti-windup element), for limiting the manipulated variable to physical limit values to be taken into consideration. The feedback of a difference formed from limited and unlimited signals to the controller input prevents the integrator from running to limits if the controller cannot achieve its desired input value owing to actuator limiting. The controller 32 supplies, on the basis of reference variable $u_{DC,desired}$ and controlled variable $u_{DC,actual}$ as values for the switching sector size, the start and end points thereof as $\phi_1$ and $\phi_2$, which are used for the switching logic for driving the semiconductor switches.

In order to avoid an excessively rapid change in the switching sector size, it may generally be expedient first to filter or smooth (e.g. by means of a PT1 element), the influencing system variable—here $u_{DC}$—before the present switching sector size $\phi_1$ is determined.

Figure 9:
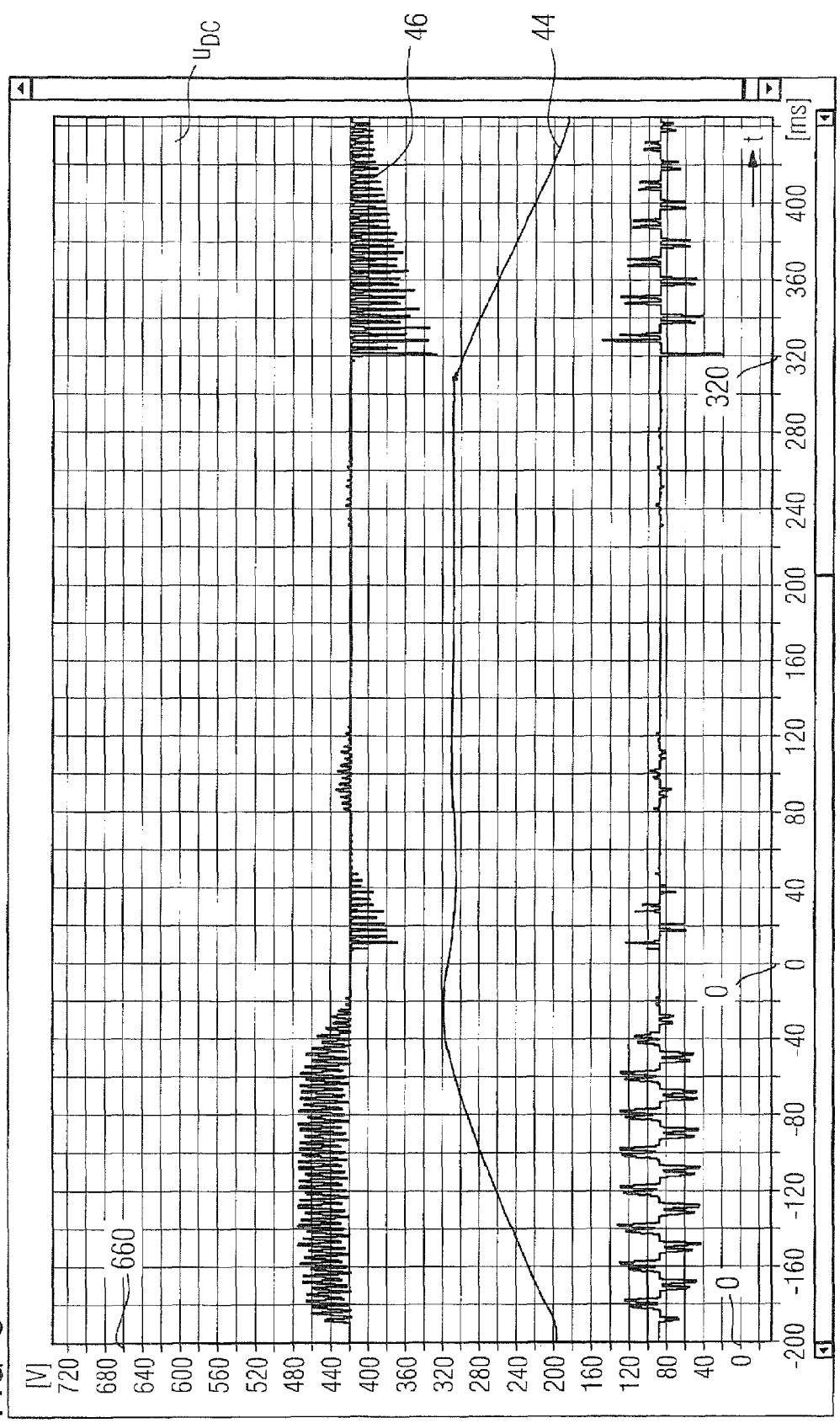
FIG. 9 shows an exemplary sequence of feedback with switching sectors shortened according to the approach according to the invention, wherein reduced rates of voltage rise become clear.

FIG. 9 shows in comparison with FIG. 3 the lower rates of voltage rise as a result of the application of the proposed method outlined above under 2. In order to accelerate a drive, firstly active power is taken up from the power supply 12 (FIG. 1) and the DC link voltage $u_{DC}$ falls. The power drawn from the power supply is shown by the graph of a rotational speed 44 and the graph of a feed-in active power 46. At the end of an acceleration ramp, energy has to be fed back momentarily owing to rotational speed overshoot (stating from t=0). The DC link voltage $u_{DC}$ rises and, starting from 660V, the feedback is started with a small switching sector and is stopped again when a lower voltage threshold is undershot or in the case of the requirement of a positive active power. Starting from t=320 ms, feedback is once again effected in order to decelerate the drive. In this case, the switching sector is enlarged again step by step in order to achieve, during permanent feedback operation, continuous 120° current blocks and hence a minimum number of switching actions.

Reduction of the Current Limit

In purely open-loop controlled methods—such as fundamental frequency operation—the power supply current is established depending on the DC link loading and the power supply voltage. In order to protect the converter 10 against overcurrents which could damage the semiconductor switches T1-T6, a circuit for rapid current monitoring and turn-off of the semiconductor switches T1-T6 is implemented according to the prior art. This circuit is usually realized in such a way that the drive signals 30 for the semiconductor switches T1-T6 affected by the overcurrent are interrupted if a predetermined or predeterminable current threshold $I_{lim,1}$ is exceeded. Instead of a pulse barrier in one or a plurality of bridge branches, the semiconductor switch T1-T6 respectively lying opposite can also be switched on. The regular driving is enabled again when the current has fallen below a lower threshold value $I_{lim,2}$ again (hysteresis) or a specific waiting time has elapsed.

Figure 10:
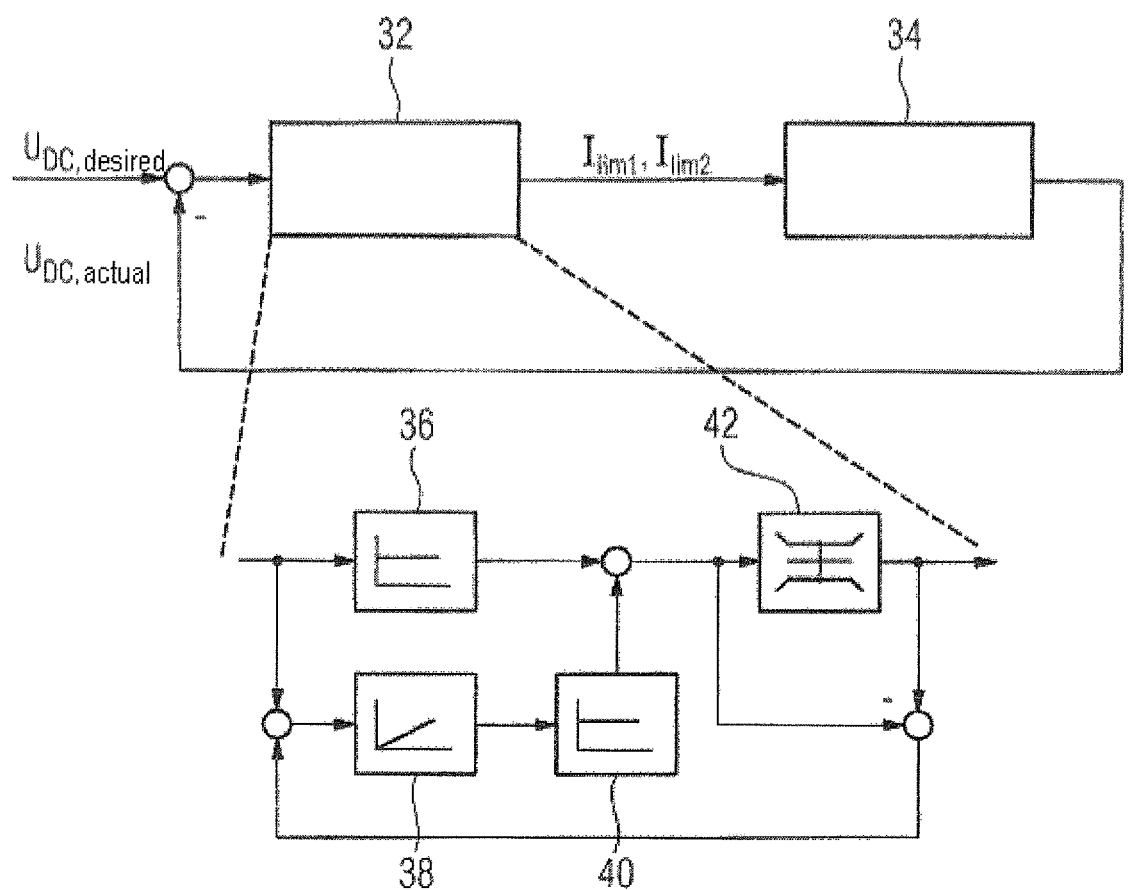
FIG. 10 shows a block diagram of a control loop for determining reduced limit values for ending the feedback.

It is now proposed, in the case of fundamental frequency converter operation according to FIG. 2, to adapt the above-mentioned current limits in the case of feedback dynamically depending on a system variable—here preferably the DC link voltage $u_{DC}$. As in the case of the approach for reducing the switching sector, this can be effected with the aid of 1. A $I_{lim,1}(u_{DC})$ characteristic curve for continuously increasing the feedback power in the case of a rising DC link voltage $$I_{lim,1}(u_{DC}) = I_0 + \left(\frac{u_{DC} - u_{DC,min}}{u_{DC,max} - u_{DC,min}}\right)I_{lim,max}$$

for $u_{DC,min} < u_{DC} < u_{DC,max}$ $I_{lim,1}(u_{DC}) = I_0 + I_{lim,max}$ for $u_{DC} \geq u_{DC,max}$ $I_{lim,1}(u_{DC}) = I_0$ for $u_{DC} \leq u_{DC,min}$, wherein a full feedback power is attained starting from $u_{DC,max}$ and the permissible phase current is the smallest below $u_{DC,min}$, and wherein, as already mentioned, the semiconductor switches T1-T6 are permanently turned off below a further $u_{DC}$ threshold, since feedback is then no longer required and charge-reversal currents between power supply and DC link are thus avoided, or 2. A $I_{lim,1}(u_{DC})$ characteristic curve as under 1, extended by an integrating term, in order to be able to operate with a full switching sector during continuous feedback operation (that is to say to achieve $I_{lim,1}(u_{DC})=I_0+I_{lim,max}$), wherein e.g. at the beginning of feedback firstly an initialization value $I_{lim,max,Init}$ can be set, wherein subsequently in the case of a digital realization in each sampling step the switching sector is increased again by the magnitude $\Delta I_1$ $I_{lim,max}(k+1)=I_{lim,max}(k)-\Delta I_1$ for $I_{lim,max}(k+1)>0$ otherwise $I_{lim,max}(k+1)=I_0$ holds true or 3. A complete closed-loop control (analog/digital) which, in particular, can also have an integrating component (with limiting and anti-windup function). In this respect, FIG. 10 shows a block diagram of the control loop comprising a DC link voltage controller 32 illustrated as controller 32 and comprising a combination—illustrated as section 34—of a current limiting and the converter 10. In accordance with the more detailed illustration of the controller 32, the latter includes a first function block 36, which functions as a proportional element (P element), a second function block 38, which functions as an integral element (I element), a third function block 40, which functions as a proportional element (P element), and a fourth function block 42, which functions as a limiting element (anti-windup element), wherein, for further explanation of the functionality of the individual function block, reference is made to the description further above in connection with FIG. 8. The controller 32 supplies, on the basis of reference variable $u_{DC,desired}$ and controlled variable $u_{DC,actual}$, limit values for the current limiting as $I_{lim1}$ and $I_{lim2}$.

Figure 11:
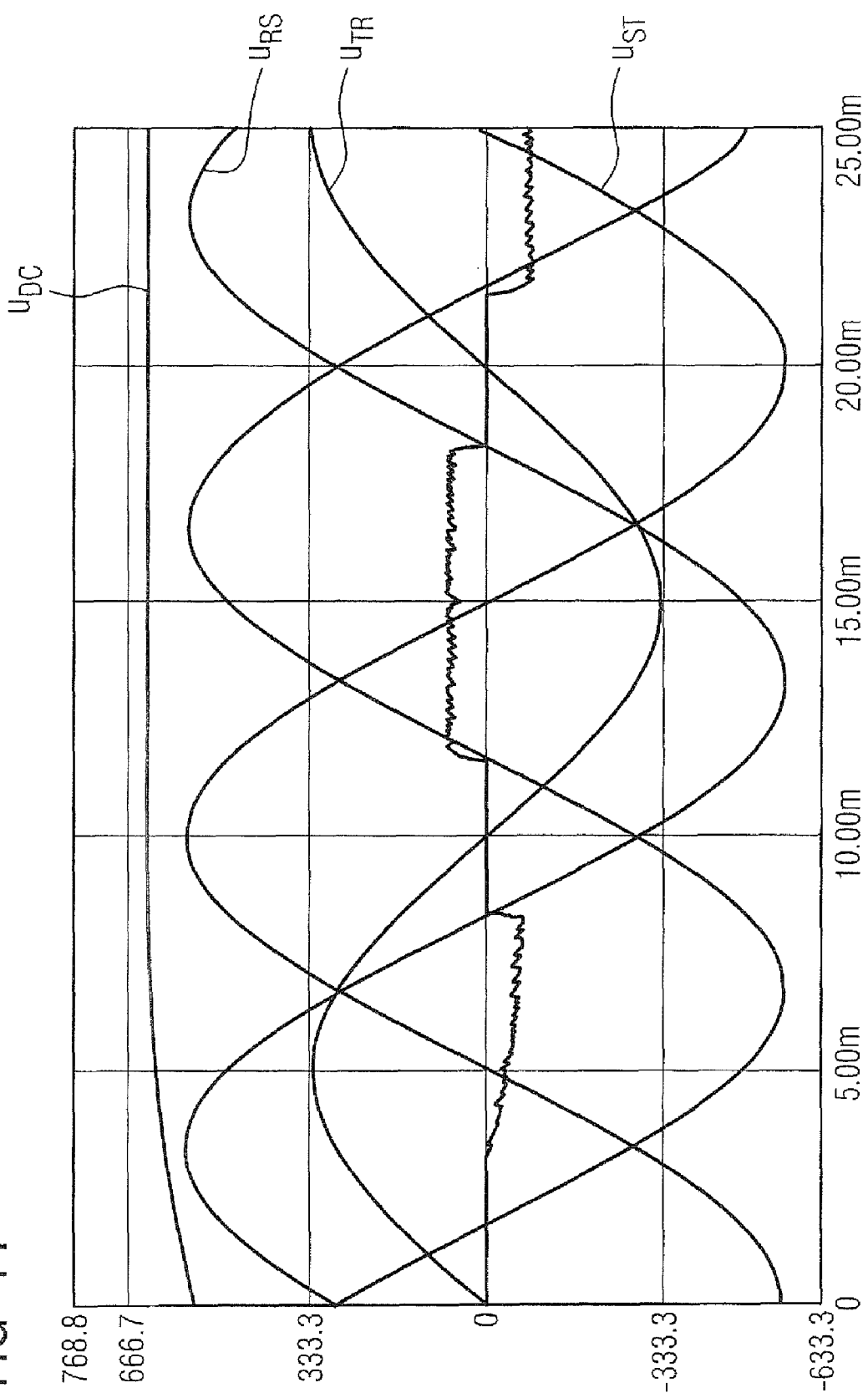
FIG. 11 shows an exemplary sequence for reducing the current limit in accordance with an additional aspect of the invention.

FIG. 11 illustrates an exemplary sequence for reducing the current limit as proposed under 1. The load to be fed from the DC link 14 into the power supply 12 is assumed to be constant as 20 kW. As the DC link voltage $u_{DC}$ rises, there is an increase in the permissible current via the semiconductor switches T1-T6. The fundamental form of the current in accordance with power supply frequency operation is maintained.

In the proposed approach for reducing the current limit, the requirement for power supply frequency clocking of the semiconductor switches T1-T6 is abandoned because such a requirement can no longer be met on account of the two-point switching for current limiting. This variant is optional in this respect and presented only for the sake of completeness. A combination of the described approaches for reducing the switching sector and for reducing the current limit is nevertheless expedient for protecting the converter.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for setting a feedback power of a converter clocked at a fundamental frequency on a power supply side and having a bridge circuit equipped with controllable semiconductor switches, the method comprising the steps of:
    clocking the semiconductor switches at the fundamental frequency in dependence of a desired direction of a power flow via the bridge circuit, and
    deriving drive signals for the semiconductor switches from clock pulses at the fundamental frequency and a switch-on delay dependent on a system variable of the converter, wherein the switch-on delay is determined from a predetermined characteristic curve that depends on the system variable.

2. The method of claim 1, wherein the system variable is a DC link voltage of a DC link circuit connected to the converter, with the switch-on delay depending on the DC link voltage.

3. The method of claim 1, wherein the characteristic curve is supplemented by an integrating term, which successively reduces the switch-on delay.

4. The method of claim 1, wherein the characteristic curve is realized with a controller.

5. The method of claim 1, wherein the predetermined characteristic curve defines limit values for limiting a current.

6. The method of claim 2, wherein the DC link voltage defines limit values for limiting a current.

7. The method of claim 2, wherein the characteristic curve is supplemented by an integrating term, which successively reduces the switch-on delay.

8. The method of claim 1, wherein the switch-on delay defines a negative switch-off delay.

9. A computer program comprising program code instructions stored on a computer-readable storage medium, the program code instructions when executed by a computer causing the computer to set a feedback power of a converter clocked at a fundamental frequency on a power supply side and having a bridge circuit equipped with controllable semiconductor switches by:
    clocking the semiconductor switches at the fundamental frequency in dependence of a desired direction of a power flow via the bridge circuit, and
    deriving drive signals for the semiconductor switches from clock pulses at the fundamental frequency and a switch-on delay dependent on a system variable of the converter, wherein the switch-on delay is determined from a predetermined characteristic curve that depends on the respective system variable.

10. A storage medium comprising a computer program executable by a computer, said computer program comprising program code instructions stored on a computer-readable storage medium, the program code instructions when executed by a computer causing the computer to set a feedback power of a converter clocked at a fundamental frequency on a power supply side and having a bridge circuit equipped with controllable semiconductor switches by:
    clocking the semiconductor switches at the fundamental frequency in dependence of a desired direction of a power flow via the bridge circuit, and
    deriving drive signals for the semiconductor switches from clock pulses at the fundamental frequency and a switch-on delay dependent on a system variable of the converter, wherein the switch-on delay is determined from a predetermined characteristic curve that depends on the respective system variable.

11. A converter device, comprising:
    a converter clocked at a fundamental frequency on a power supply side, said converter comprising a bridge circuit equipped with controllable semiconductor switches which are clocked depending on a desired direction of a power flow through the bridge circuit,
    means for deriving drive signals for the semiconductor switches from clock pulses at the fundamental frequency and a switch-on delay dependent on a system variable of the converter, and
    means for determining the switch-on delay based on a predetermined characteristic curve that depends on the system variable.

12. The converter device of claim 11, wherein the system variable is a DC link voltage of a DC link circuit connected to the converter, with the switch-on delay depending on the DC link voltage.

13. The converter device of claim 11, further comprising a processing unit, said processing unit including the means for deriving the drive signals and the means for determining the switch-on delay.

* * * * *